United States Patent [19]

Ghosh et al.

[11] Patent Number: 5,265,244
[45] Date of Patent: Nov. 23, 1993

[54] METHOD AND SYSTEM FOR FACILITATING PROCESSING OF STATISTICAL INQUIRES ON STORED DATA ACCESSIBLE THROUGH A DATA ACCESS STRUCTURE

[75] Inventors: Sakti P. Ghosh; Raymond A. C. Lorie, both of San Jose, Calif.

[73] Assignee: International Business Machines Corporation, Armonk, N.Y.

[21] Appl. No.: 541,448

[22] Filed: Jun. 22, 1990

Related U.S. Application Data

[63] Continuation-in-part of Ser. No. 829,730, Feb. 14, 1986, abandoned.

[51] Int. Cl.$^5$ ............................................. G06F 12/00
[52] U.S. Cl. ........................... 395/600; 364/DIG. 1; 364/222.81; 364/282.1; 364/283.2
[58] Field of Search ............... 364/DIG. 1 MS File, 364/DIG. 2 MS File; 395/1, 50, 51, 52, 53, 54, 55, 250, 600, 700, 800

[56] References Cited

U.S. PATENT DOCUMENTS

| | | | |
|---|---|---|---|
| 3,104,376 | 9/1963 | Nadler | 364/900 |
| 3,388,381 | 6/1968 | Prywes et al. | 364/200 |
| 3,678,461 | 7/1972 | Choate et al. | 364/200 |
| 3,916,387 | 10/1975 | Woodrum | 364/200 |
| 4,030,078 | 6/1977 | Klüge | 364/900 |
| 4,086,628 | 4/1978 | Woodrum | 364/200 |
| 4,286,330 | 8/1981 | Isaacson | 364/900 |
| 4,429,385 | 1/1984 | Cichelli et al. | 364/900 |
| 4,468,728 | 8/1984 | Wang | 364/200 |
| 4,497,039 | 1/1985 | Kitakami et al. | 364/900 |
| 4,499,596 | 2/1985 | Casey et al. | 382/37 |
| 4,536,837 | 8/1985 | Olson et al. | 364/200 |
| 4,558,413 | 12/1985 | Schmidt et al. | 364/200 |
| 4,606,002 | 8/1986 | Waisman et al. | 364/200 |
| 4,611,272 | 9/1986 | Lomet | 364/200 |
| 4,611,898 | 9/1986 | Schuldt | 364/900 |
| 4,622,632 | 11/1986 | Tanimoto et al. | 364/200 |
| 4,677,550 | 6/1987 | Ferguson | 364/300 |
| 4,710,763 | 12/1987 | Franke et al. | 340/723 |

OTHER PUBLICATIONS

D. Comer, "The Ubiquitous B-Tree", Computing Surveys, vol. 11, No. 2, Jun. 1979, pp. 121-137.
R. G. Casey, "Automatic Generation or OCR Logic From Scanned Characters", IBM Tech. Disclosure Bulletin, vol. 22, No. 3, Aug. 1979, pp. 1189-1190.
"Relational Database Systems," Computing Survey, published by ACM., vol. 11, No. 3, pp. 185-211 (1979).
VSAM (OS/VS Virtual Storage Access Method (VSAM)-Programmer's Guide, IBM Form GC26-3838 (1975b)).
"Organization and Maintenance of Large Odered Indexes", by R. Bayer & C. McCreigh Acta. Inf. vol. 1, No. 3, pp. 173-189 (1972).

Primary Examiner—Robert B. Harrell
Attorney, Agent, or Firm—James C. Pintner; Pryor A. Garnett

[57] ABSTRACT

A data access structure facilitates the processing of statistical queries concerning records stored in the structure. The structure, according to the present invention, includes a plurality of data nodes storing the records, and a plurality of access nodes, each storing at least one pointer to another access node or to a data node, and arranged according to an organization whereby each access node is linked directly or indirectly to at least one data node. Statistical information is stored in or linked to the nodes of a subset of the plurality of access nodes and data nodes. The statistical information concerns the records stored in the data node or data nodes linked directly or indirectly to the respective nodes of the subset. Further, a software algorithm is provided responsive to changes in the records stored in the data nodes for updating the statistical information in the access structure concerning the records stored in the data node. The present invention is suitable for implementation with a wide variety of hierarchical and non-hierarchical access methods, including those based on the B-tree, ISAM, RRDS (Relative Record Data Set) of IBM VSAM, and HDAM of IBM IMS.

22 Claims, 7 Drawing Sheets

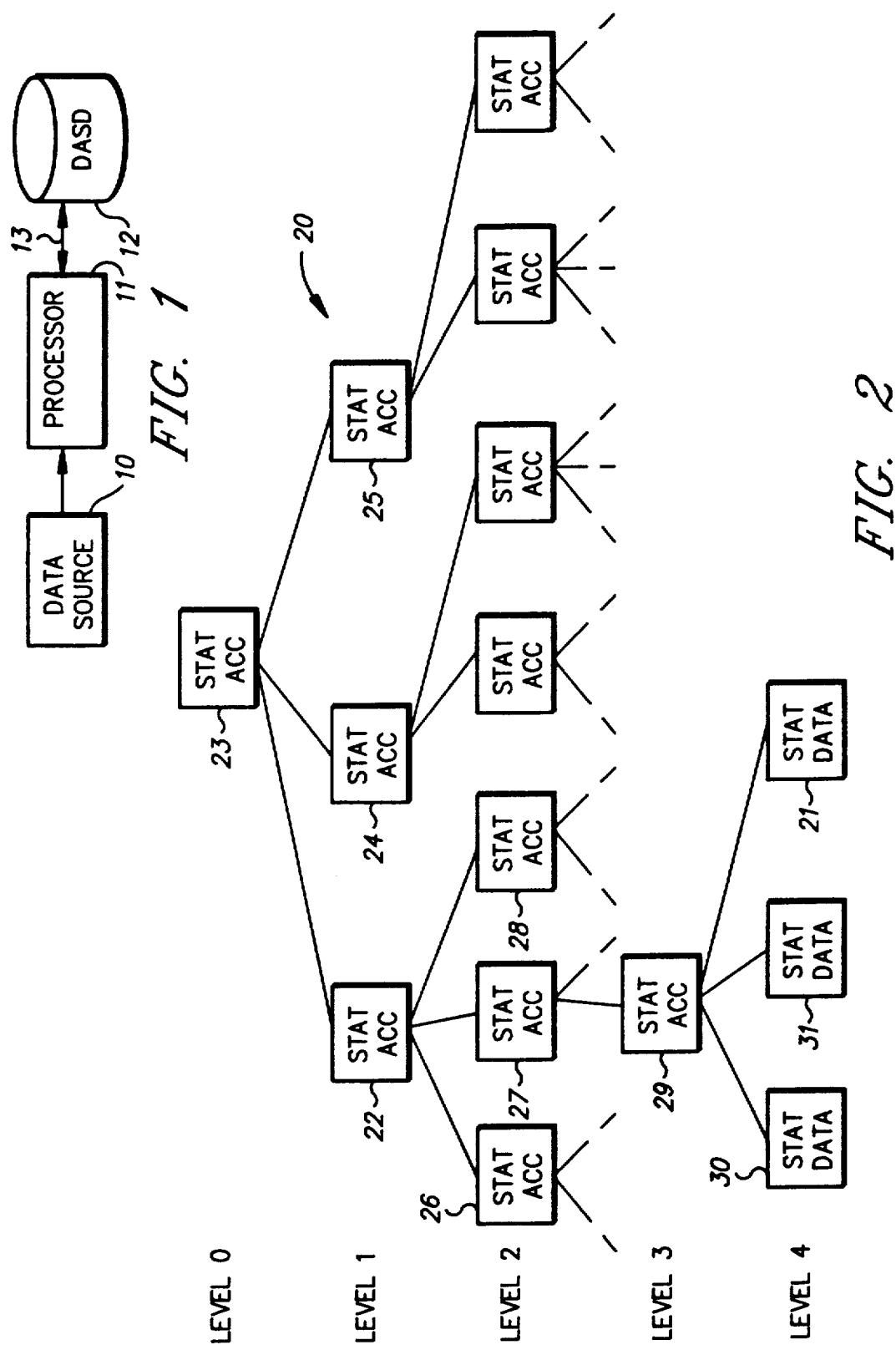

```
1   DO WHILE (add new record having value V);
2       n'_3 = n'_3 + 1;
3       S'_3 = S'_3 + V;
4       IF (n'_3 - n_3) / n_3 > threshold; OR
5          (S'_3 - S_3) / S_3 > threshold;
6       THEN DO;
7          n'_2 = n'_2 + n'_3 - n_3;
8          S'_2 = S'_2 + S'_3 - S_3;
9          n_3 = n'_3;
10         S_3 = S'_3;
11      END OF LOOP;
12  END;
```

PSEUDOCODE FOR UPDATING STATISTICAL INFORMATION

*FIG. 8*

METHOD AND SYSTEM FOR FACILITATING PROCESSING OF STATISTICAL INQUIRES ON STORED DATA ACCESSIBLE THROUGH A DATA ACCESS STRUCTURE

CROSS-REFERENCE TO RELATED APPLICATION

This is a continuation-in-part of U.S. patent application Ser. No. 06/829,730, filed Feb. 14, 1986 (now abandoned).

FIELD OF THE INVENTION

The present invention relates to data access methods and physical data organizations or structures for implementing the access methods. In particular, the present invention provides a structure facilitating accesses to data for statistical processing.

BACKGROUND OF THE INVENTION

Database management systems (DBMS) have many important components, such as a data model, a data definition language, a data manipulation language, a query language, data access methods, a query optimizer, a concurrency and locking mechanism, etc. All of these components contribute to the desired properties of a database management system. Most of the fundamental concepts of database management system are described in any standard text book on DBMS: See, Ghosh S., *Data Base Organization for Data Management*, Published by Academic Press, New York (1977); Date C. J., *An Introduction to Database Systems*, Published by Addison-Wesley, Reading, Mass. (1977); Wiederhold G., *Database Design*, Published by McGraw-Hill, New York (1977).

Many DBMS product descriptions are available in the manuals provided by the different commercial vendors. DBMS products based on a relational model have been developed and an excellent summary of some of these products has been given by Kim W., "Relational Database Systems," *Computing Survey*, Published by ACM., Vol. 11, No. 3, pp. 185-211 (1979).

Among the components of a DBMS, the access methods and structures for implementing the methods are responsible for organizing the bits and bytes of the data on the storage media and servicing I/O requests from a host processor.

Many excellent access methods like ISAM (*System 360 Operating System, Index Sequential Access Methods (Programming Logic)*, IBM Form Y28-6618 (1975a(out of print)) based on index sequential search, VSAM (*OS/VS Virtual Storage Access Method (VSAM) Programmer's Guide*, IBM Form GC26-3838 (1975b)) based on B-trees (Bayer R. and McCreight C., "Organization and Maintenance of Large Ordered Indexes", *Acta. Inf.* Vol. 1, No. 3, pp. 173-189 (1972)) were invented to expedite the searching of information contained in files stored in a computer. These access methods have succeeded in reducing significantly, the search time involved in retrieving information from a database.

All of these prior art access methods have been designed to expedite logical processing of information, e.g. find a record with key equal to xxx, or find all records which satisfy the predicate P(A), or update the records with attribute A having the value xxxx, etc. There are many other search techniques (Knuth D., *The Art of Computer Programming*, Vols. 1, 2, 3, Published by Addison-Wesley Publ. Co., Reading, Mass. (1968)), other than those which have been implemented in commercial access methods, but all of them have been designed to make the logical processing of information efficient. If the mean value of an attribute is to be calculated from the records organized by any of the existing access methods, all the records in the file have to be processed, which is very time consuming.

In general, statistical processing of information, such as the computation of the mean, is slow in systems designed for logical processing.

There are various types of statistical processing of information (Kendall M. G. & Stuart A., *The Advance Theory of Statistics*, Vol. 1, Published by Charles Griffin & Company, London (1958); and Kendall M. G. & Stuart A., *The Advance Theory of Statistics*, Vol. 2, Published by Hafner Publishing Co. New York, (1961)). Most of them have to deal with computing some numerical function based on values of many individuals, usually all the individuals (records) of the file. This makes statistics computation, time consuming. Examples of statistics computation are: estimation of parameters, curve fitting, statistical summarization (calculation of frequency distributions, moments, tabular representation, etc.), statistical testing of hypothesis, sampling, statistical design of experiments, statistical measures of associations, statistical prediction, etc. It should be noted that the final results of statistical processing of information are numbers having an accuracy or precision associated with them.

A fundamental element associated with statistical processing of information is the time needed for processing. One of the major goals of computer science is to minimize the processing time. Usually this is achieved by trading with a requirement for storage space. In statistical computation, precision is another fundamental element that can be traded to minimize time.

SUMMARY OF THE INVENTION

In recognition of this ability to trade off time, space and precision in statistical queries, the present invention provides a data access structure which facilitates the processing of statistical queries concerning records stored in the structure.

The structure, according to the present invention, comprises a plurality of data nodes storing the records, and a plurality of access nodes, each storing at least one pointer to another access node or to a data node, and organized so that each access node is linked directly or indirectly to at least one data node. Statistical information is associated with a subset of the plurality of access nodes and data nodes concerning the records stored in the data node or data nodes linked directly or indirectly to the respective access node and/or data node.

Further, a means is provided responsive to changes in the records stored in the data nodes for updating the statistical information stored in the access structure.

The present invention is suitable for implementation with a wide variety of hierarchical and non-hierarchical access methods, including those based on the B-tree, ISAM (Index Sequential Access Method), RRDS (Relative Record Data Set) of IBM VSAM (Virtual Storage Access Method of International Business Machines Corporation), and HDAM (Hierarchical Direct Access Method) of IBM IMS (Information Management System of International Business Machines Corporation).

By maintaining statistical information in association with access nodes in a data access structure, statistical queries can be resolved by reading the statistical information from a subset of the nodes in the access structure, vastly saving in the amount of access time necessary to process the statistical queries. For queries requiring greater precision, the user can proceed all the way down the access structure to the actual records, so no information is lost. In addition, the means for updating the statistical information can be adapted to maintain the precision desired at any level in the structure.

BRIEF DESCRIPTION OF THE DRAWINGS

FIG. 1 is a simplified overview block diagram showing the elements of a database system.

FIG. 2 is a diagram of a data access structure according to the present invention.

FIG. 8 is a pseudocode implementation of the algorithm for updating the statistical information.

DETAILED DESCRIPTION

Figure 3:
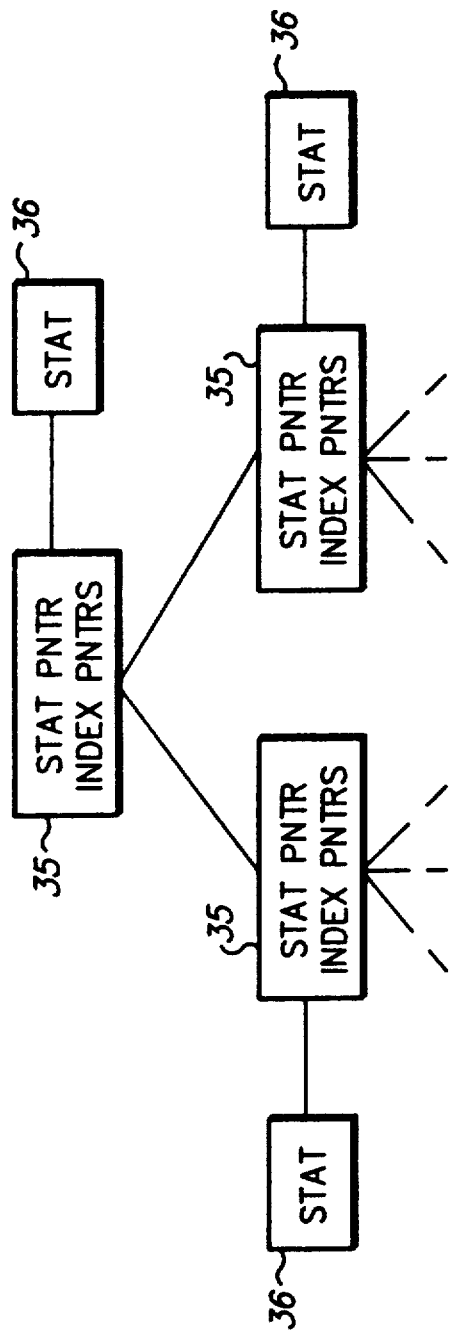
FIG. 3 is a diagram of an alternative means for associating statistical information with the nodes in a structure such as is shown in FIG. 2.

With reference to the figures, a detailed description of the present invention is provided.

FIG. 1 is a simplified diagram of a data processing system that might implement the present invention. The data processing system includes a data source 10 such as a communication channel or a human operated keyboard. The data source 10 communicates with a processor 11 for processing the data according to user specifications. The processor 11 typically communicates with a direct access storage device 12 (DASD). The direct access storage device 12 maintains data provided by the processor 11 in non-volatile storage. The processor 11 organizes the data according to an access structure and provides control information across the channel 13.

The system illustrated in FIG. 1 is vastly simplified for the purposes of description. The present invention is concerned with the organization of the data on the DASD 12 as it is maintained by the processor 11. The typical systems may include multiple processors and large numbers of storage devices.

FIG. 2 illustrates a data access structure 20 according to the present invention for facilitating the processing of statistical queries concerning records stored in the structure. The data records are stored in a plurality of data nodes, such as data node 21. The access structure 20 also includes a plurality of access nodes, such as access node 22. Each of the access nodes stores access information ACC such as at least one pointer to or identifier of another access node or a data node. The access nodes are organized so that each access node is linked directly or indirectly to at least one data node in the structure. The pointers are represented in FIG. 2 by lines from an access node to another access node or from an access node to a data node. According to the present invention, statistical information STAT is linked directly or indirectly to a subset of the plurality of access nodes and data nodes concerning the records stored in the data node or data nodes linked directly or indirectly to the respective access node and/or data node.

The structure shown in FIG. 2 includes a plurality of levels, labeled level 0 through level 4. This level description can be generalized into series notation indicating each level as level i, where i goes from 0 to n. In the implementation shown in FIG. 2, n is equal to 4. Level 0 is a root access node 23 storing pointers to the access nodes 22, 24 and 25 in level 1.

The access nodes in level i each have pointers to a subset of the access nodes in the level i+1 for i equal to 1 through n−1. Thus access node 22 in level 1 stores pointers to access nodes 26, 27 and 28 in level 2. Access node 27 in level 2 includes pointers to access node 29 and possibly other access nodes in level 3.

The access node 29 in level 3 stores pointers to the data nodes 21, 30 and 31 in level 4.

Thus it can be seen that level n stores data nodes in which actual records are maintained.

The statistical information is maintained for a subset of the access nodes and data nodes. In the embodiment shown in FIG. 2, the subset includes all of the access nodes and data nodes that make up the data access structure 20. The user could adapt the invention to maintain statistical information for instance in only one level of the structure, depending on the desired trade offs between storage space, precision and access time.

As shown in FIG. 2, the statistical information is stored in a record contained in the access nodes in the storage device, so that a single access to an access node will provide statistical information as well as pointers leading through the access structure to the actual data.

FIG. 3 illustrates an alternative structure for linking the statistical information to the access nodes. In particular, the access nodes, such as node 35 in FIG. 3, store a pointer to the statistical information STAT PNTR as well as index pointers INDX PNTRS to the access nodes in the structure. The statistical information STAT is stored in the storage device at a location 36 indicated by the statistical pointer STAT PNTR. This alternative structure saves space in the access structure but costs an additional access for the purpose of processing a statistical query associated with the access nodes.

In an access structure such as is shown in FIG. 2, in which the data nodes also have statistical information maintained for them, statistical pointers such as shown in FIG. 3 can be used to link the statistical information to data nodes.

The access structure such as shown in FIG. 2 can be stored on a few successive cylinders in a disk drive such as DASD 12 as shown in FIG. 1. The data nodes are stored in the data storage system at the locations indicated by the access structure. The statistical information can be stored with the access structure as is described with reference to FIG. 2 in the same cylinders and at the same address as a particular access node with which the statistical information is associated. Alternatively, the statistical information can be stored in a few adjacent cylinders to the access structure itself with pointers in the access structure to the linked statistical information.

As mentioned above, the processor 11 shown in FIG. 1 operates to maintain the access structure, such as the hierarchical structure 20 shown in FIG. 2, as the records stored in the data nodes are inserted, changed or deleted. One well known method for maintaining an access structure is called the B-tree. A good description of the B-tree data organization is provided in Jeffrey D. Ullman, *Principles of Database Systems*, second edition, Computer Science Press (1982), pages 58–65. According to the present invention, the processor 11 further maintains a statistical information STAT in the hierarchical data structure 20 during execution.

Figure 4A:
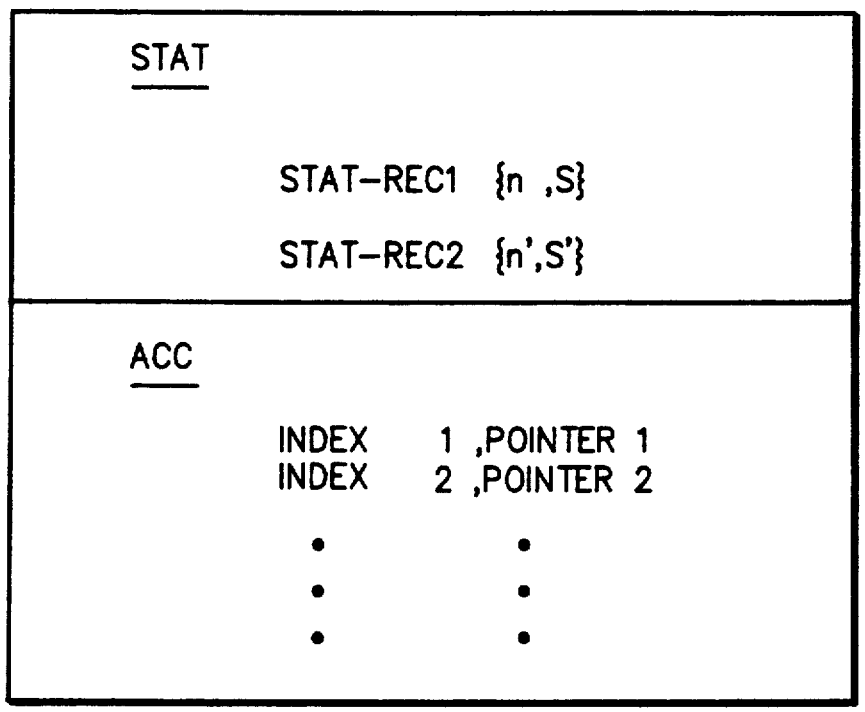
FIGS. 4A and 4B are charts showing the structure of an access node and of a data node respectively, according to one embodiment of the present invention.
Figure 4B:
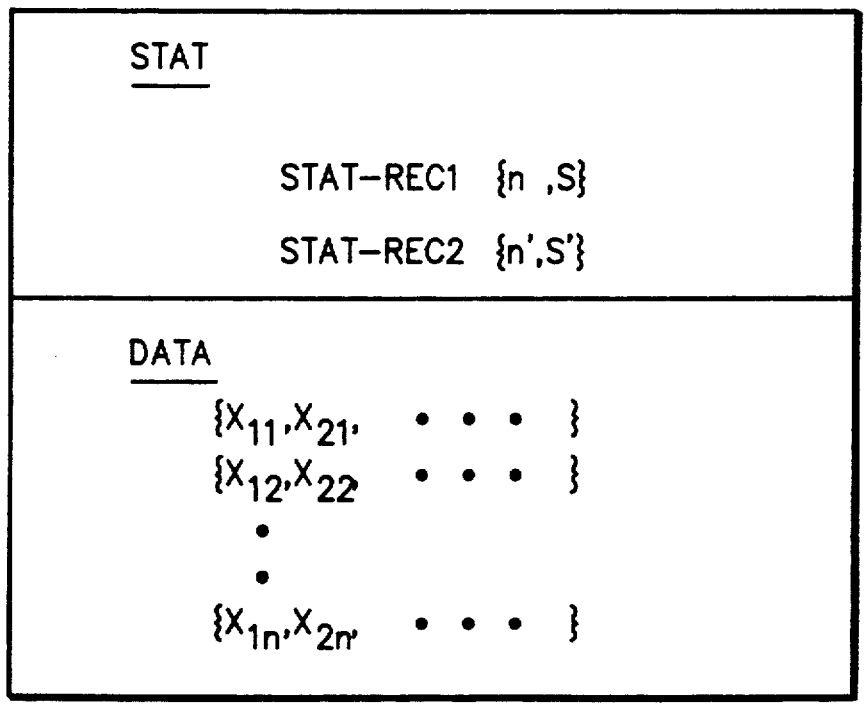

FIGS. 4A and 4B illustrate the format of an access node and of a data node, respectively, according to the present invention. FIG. 4A illustrates an access node. The statistical information STAT maintained is the number of records n that are stored in data nodes to which the particular access node is linked directly or indirectly, and for example the summation S of an attribute X of each of the n records. The statistical information can also include such things as the summation of the squares of X, the median, the mode, frequency distributions over n, multivariate statistics or other information that facilitates the processing of statistical queries likely to be processed using the database.

The statistical information STAT is maintained in a form including STAT-REC1 and STAT-REC2. STAT-REC1 maintains current statistical information for the access node. STAT-REC2 stores the last promoted version of the statistical information, designated n', and the summation S' of the attribute X for k=1 to n'. So in a hierarchical structure, STAT-REC1 for a given node on level i is generated from the STAT-REC2 values from the nodes in level i+1 associated with the given node. The use of the last promoted version STAT-REC2 is described below with reference to the method for maintaining the statistical information in the access structure.

The access information ACC leading through the access structure is stored in a second part of the access node shown in FIG. 4A. In an access structure based on a hierarchical index, such as the B-tree, the access information ACC includes with each pointer an index value such as index 1, pointer 1. The index identifies, for instance, a maximum value or a range of values for the records stored in data nodes of nodes down the hierarchical structure pointed to by pointer 1. Likewise, the second entry in the access node includes index 2 and pointer 2, and so on according to the access structure.

FIG. 4B illustrates the organization of a data node. The statistical information STAT in the data node in the preferred embodiment also maintains the current statistical information STAT-REC1 and the last promoted version STAT-REC2. STAT-REC1 is calculated in response to actual changes in the record in the data node. The data is maintained in tables which associate p attributes $X_{1k}, X_{2k}, \ldots, X_{pk}$ with each record k, for k equal to 1 to n. In the data node shown in FIG. 4B, STAT-REC1 stores n which identifies the number of data records maintained in the data node. Thus a plurality of records are stored in the data section of the data node which have the attribute $X_{jk}$, for j going from 1 to p and k going from 1 to n.

Figure 5:
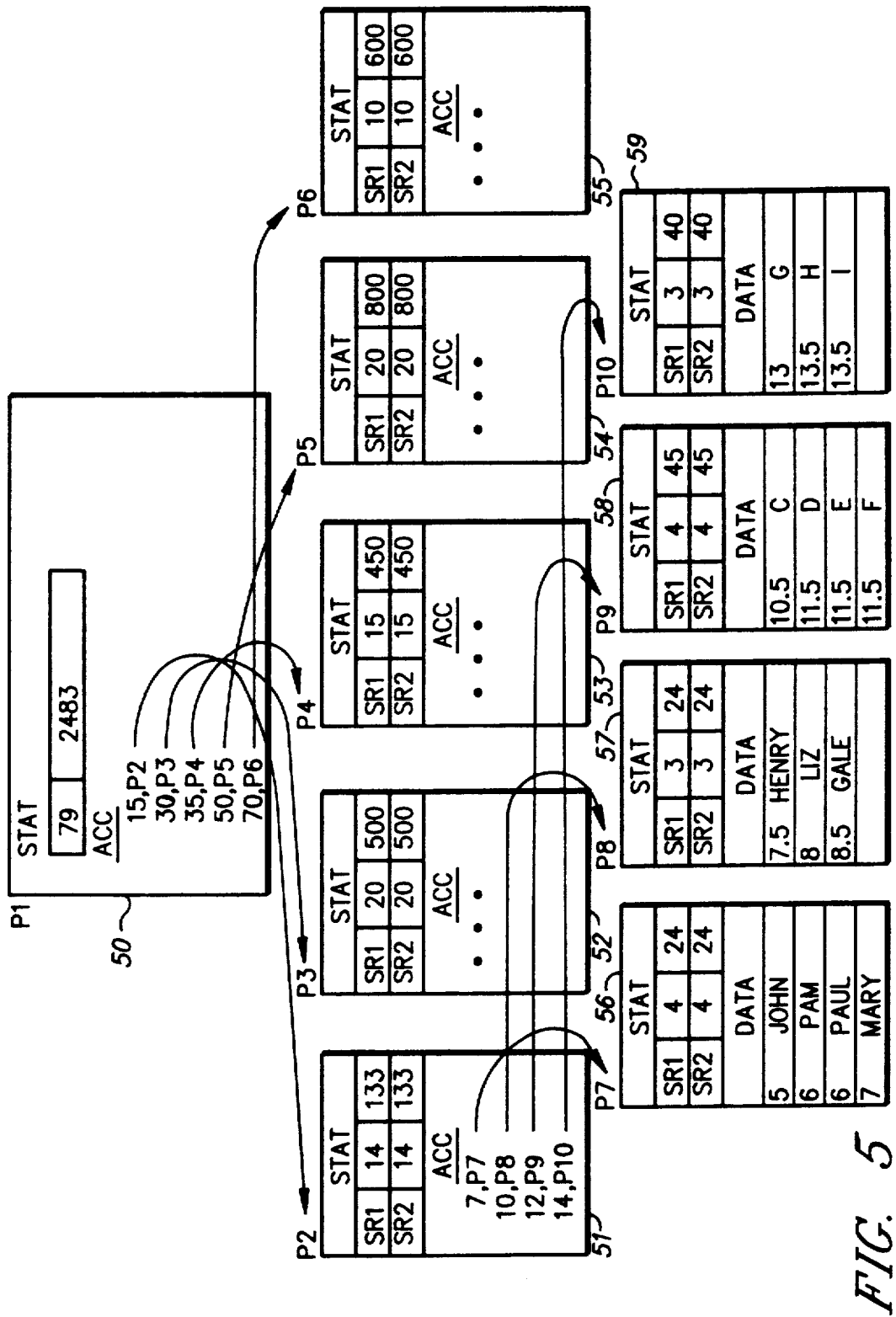
FIG. 5 is a diagram of a B-tree access structure implemented according to the present invention.

FIG. 5 provides an example of a 3 level B-tree data structure having statistical information according to the present invention organized as shown with reference to FIGS. 4A and 4B. The root access node 50 in level 0 maintains only one copy of the statistical information, n and summation S as k goes from 1 to n of the values of attribute $X_{1k}$. The access information of the root access node 50 includes an indicator of the range of values (the maximum value in the example shown) of the attribute by which the access structure is organized in its child nodes and a pointer to or other identifier of a location of an access node in level 1.

In the embodiment shown in FIG. 5 there are five pointers in the root node 50 which point to pages P2, P3, P4, P5 and P6 all in level 1 as indicated by the arrows. The access nodes 51, 52, 53, 54, 55 in level 1 store a current copy of the statistical information STAT-REC1 designated SR1 in the figure and a copy of the last promoted version STAT-REC2 designated SR2 in the figure. It can be seen that the number n stored in P1, the root access node 50, is equal to the sum of the values of n' stored in the last promoted version SR2 of the statistical information for the access nodes in level 1. Thus 79 is equal to the sum of 14, 20, 15, 20 and 10. Furthermore, the value of the summation S of $X_{1k}$ stored in the root access node 50 is equal to the sum of the last promoted versions S' from SR2 in the access nodes in level 1.

Each of the access nodes in level 1 includes pointers to data nodes. In the figure only the pointers from access node 51 labeled P2 are provided for the purpose of description. As can be seen, there are four pointers in access node 51, pointing to pages P7, P8, P9 and P10 respectively. The statistical information stored in SR1 in the access node 51 is a summary of the statistical information stored in the data nodes 56, 57, 58, 59 stored in pages P7, P8, P9 and P10 respectively. In particular, it is the sum of the last promoted versions SR2 stored in data nodes. Thus 14 is equal to the sum of 4, 3, 4 and 3. 133 is the sum of 24, 24, 45 and 40.

When the data record is set up or in steady state, the last promoted version SR2 of a statistical information is identical to the current version SR1. Thus, that is shown in the example shown in FIG. 5.

In order to calculate the mean using an access structure such as shown in FIG. 5, the user must retrieve the values n (the number of records) and S (the summation of the values of the attribute $X_{1k}$) from the root access node. The mean equals S/n, or in the example 2483/79.

In order to compute the mean of an attribute stored in the access structure shown in FIG. 5, the root access node 50 is accessed and the statistical information, n and S, is retrieved. The mean is equal to S/n or 2483/79. If data records have been changed so that the values of SR1 and SR2 in the nodes in level 2 differ, then the statistical information stored in SR1 in the level 2 nodes could be retrieved for more precision.

The algorithm for computation of the median set out below illustrates the computation of a statistical query based on sorting according to the present invention.

Median Calculation:

```
GET n from STAT-REC in root page
SET m0 = [(n+1)/2]
SET m = 0
SET P = pointer to root access node
DO WHILE (P points to an access node)
    CALL SUBROUTINE (m,m0,P)
    SUBROUTINE: PROC (m,m0,P)
    DO WHILE m < m0
        Scan in ascending order the STAT-REC2 in
            pages pointed to by the
            indices in the scanned access node.
        SET P to pointer of node examined;
```

Median Calculation:

```
        SET m = m + n (from STAT-REC of node);
    END DO LOOP;
        SET m = m - n (from root node);
    END SUBROUTINE
END DO LOOP
GO TO the (m₀ - m)th data record in node pointed to by
    P. The median is equal to the value of the
    Attribute from the retrieved record.
END
```

So for the example shown in FIG. 5, the median is calculated as follows:

$m_0 = (79+1)/2 = 40$;
For $P = P2$, $m = 0 + 14 = 14$;
For $P = P3$, $m = 14 + 20 = 34$;
For $P = P4$, $m = 34 + 15 = 40$;
Since $49 > 40$, set $m = 49 - 15 = 34$;
$m_0 - m = 40 - 34 = 6$;

The median is equal to the value of the attribute in the 6th record in P4.

The statistical information is maintained in the B-tree in response to changes in the records stored in the data nodes. Software in the processor 11 associated with the storage facility maintains the statistical information in the preferred embodiment as it is described below.

Figure 6:
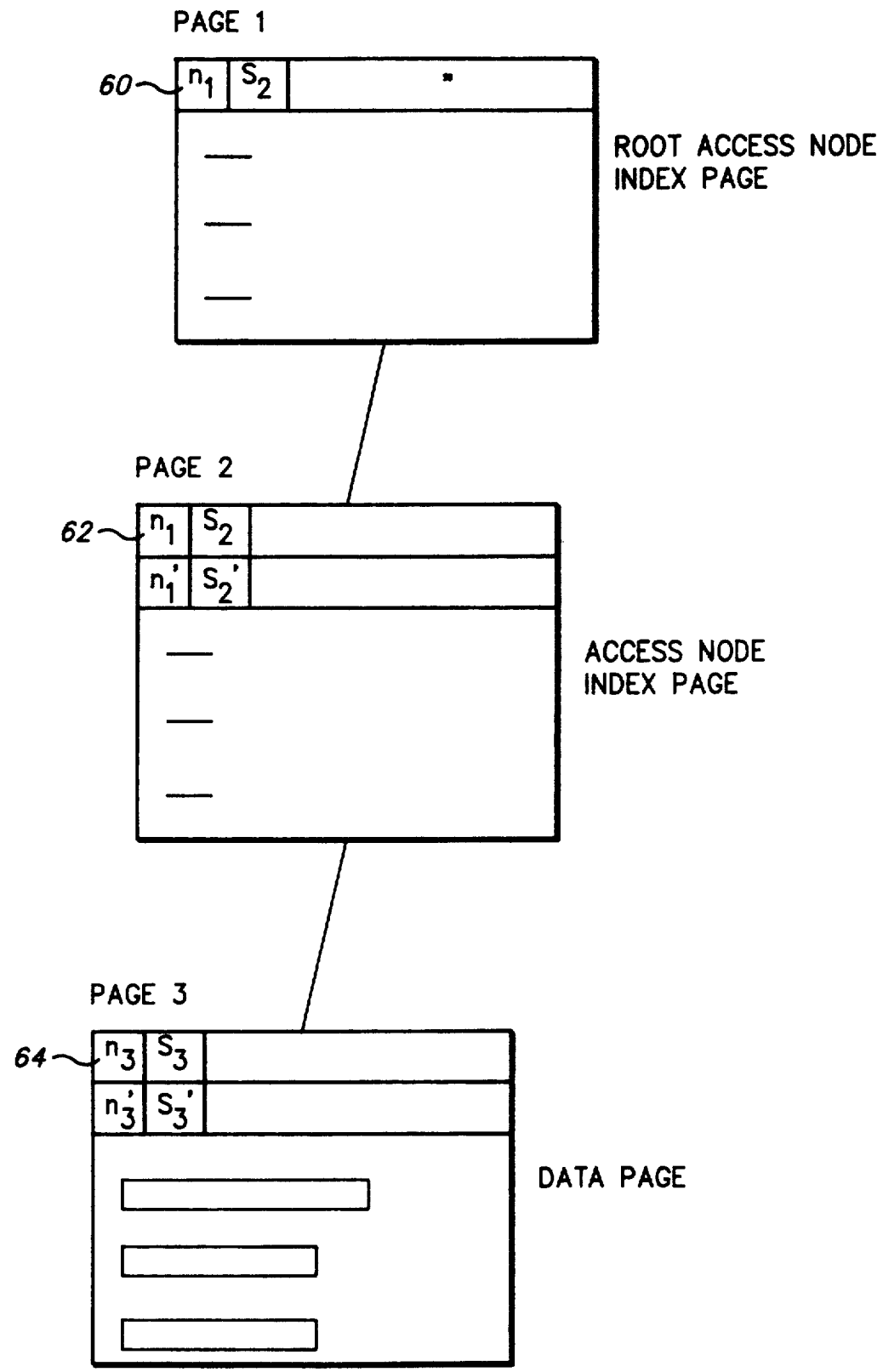
FIG. 6 is a diagram utilized for illustrating the steps in updating statistical information associated with access nodes in the access structure.

FIG. 6 illustrates two index pages, page 1 and page 2 and a data page, page 3, in a hierarchical structure such as is shown in FIG. 2. Page 60 is the root access node storing $n_1$ and $S_1$. Page 62 is an access node storing in SR1 $n_2$ and $S_2$ and in SR2 $n'_2$ and $S'_2$. In the data node page 64, $n_3$ and $S_3$ are stored in SR1 and $n'_3$ and $S'_3$ in SR2.

When a new record is added to the data page 64, STAT-REC2 of the data page is updated. Suppose one record having value V of attribute X is added to page 64; thus the new values of $n'_3$ and $S'_3$ are:

$n'_3 = n'_3 + 1$;

$S'_3 = S'_3 + V$;

The algorithm for updating the statistical information in response to the addition of a new record in a data node is outlined as shown in FIG. 8:

The same algorithm can be applied to either an access node 60,62 or a data node 64.

Figure 7:
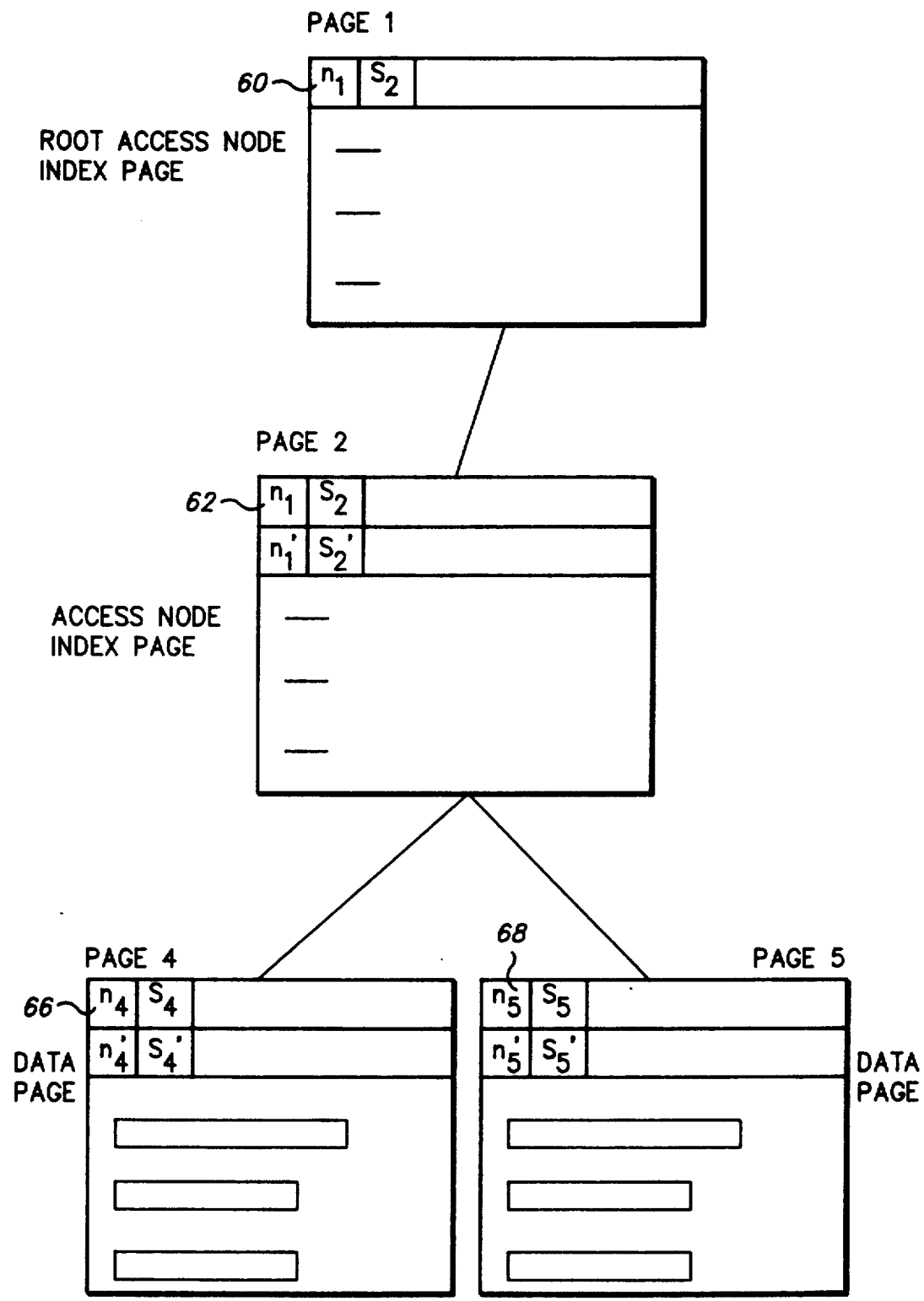
FIG. 7 is a diagram illustrating the effects of node splitting after the insertion of a new data page in a B-tree structure implemented according to the present invention.

The deletion algorithm is the same as update algorithm except for deletion of a record having value D of attribute X the values of the statistical information $n'_3$ and $S'_3$ are updated as follows:

$n'_3 = n'_3 - 1$ and $S'_3 = S'_3 - D$;

Suppose a record is inserted in page 64 which results in a split into two pages, page 66 and page 68, as shown in FIG. 7 as in a B-tree split:

$n'_3$ is split into $n_4$ and $n_5$
$S'_3$ is split into $S_4$ and $S_5$; such that $n'_3 = n_4 + n_5$ $S'_3 = S_4 + S_5$ In the insertion algorithm the formula for the $n'_2$ and $S'_2$ will be the same if calculated using $n'_3$ and $S'_3$. If the parameters of pages 4 and 5 are used, then new formulas are:

$n'_2 = n'_2 + n_4 + n_5 - n_3$ $S'_2 = S'_2 + S_4 + S_5 - S_3$

Updating is a combination of insertion and deletion; the updating algorithm will be a combination of the insertion algorithm and deletion algorithm as discussed before.

By selecting the threshholds involved in the updating algorithm described above, the user is able to trade off precision in the statistical information against the time required to maintain the information current. The threshholds may have different values for the different kinds of statistical information maintained and for the different levels in the access structure. The following example is provided to illustrate how threshholds may be selected for statistical information involving the mean of an attribute X.

Suppose the mean M before update is given by $(S_1 + S_2 + \ldots + S_k)/n$.

Suppose in the updating of records stored in one or more data nodes, the summation entries $S_{k-j}, S_{k-j+1}, \ldots, S_k$ are changed in the data pages to $S'_{k-j}, S'_{k-j+1}, \ldots, S'_k$.

Then the true mean $M_U$ after the update can be expressed as follows:

$$\begin{aligned} M_U &= (S_1 + S_2 + \ldots + S_{k-j-1} + S_{k-j}' + S_{k-j+1}' + \ldots + \\ & \quad S_k')/(n_1 + n_2 + \ldots + n_{k-j-1} + n_{k-j}' + \\ & \quad n_{k-j+1}' + \ldots + n_k') \\ &= (M + e_s/n)/(1 + e_n/n); \\ &= (M + e_s/n)(1 + e_n/n)^{-1}; \end{aligned}$$

where $e_s = (S'_{k-j} - S_{k-j}) + (S'_{k-j+1} - S_{k-j+1}) + \ldots + (S'_k - S_k)$ and
$e_n = (n'_{k-j} - n_{k-j}) + (n'_{k-j+1} - n_{k-j+1}) + \ldots + (n'_k - n_k)$.

$M_U$ can then be approximated by:

$$\begin{aligned} M_U &= (M + e_s/n)(1 - e_n/n); \\ &= M + e_s/n - M(e_n/n) + (e_s \cdot e_n)/n^2 \end{aligned}$$

Thus when the mean M prior to an update is used as an estimate of the true mean $M_U$ after the update has occurred then the relative error E can be expressed as follows:

$E = e_s/nM - e_n/n + (e_s e_n)/Mn^2$

Thus if the threshold for the error in the sums $e_s$ is selected to equal $\alpha_s$ and for the error in the counts $e_n$ to equal $\alpha_n$, then the impact of the selected threshhold on the estimate of the mean from the STAT-REC stored in the root node can be expressed as follows:

$\alpha_s/nM - \alpha_n/n + \alpha_n \alpha_s/M$.

So as a practical rule we can set much higher threshold limits for "the sums" and lower threshold limits for "the counts" in the data nodes than in the access nodes.

Thus we can set a threshold of 10% relative errors in the sums and 1% relative errors for the count in the data nodes. The threshold in the next higher level of access nodes for the sums can be set at 8% or 9% and for the count can be set at 2% or 3%. This process can be repeated through the chain of the access nodes. Thus for 5 or 6 levels of indexing, the threshold for the count in the root node could be as high as 10% and for the sums as low as 1% according to this example.

As in the example discussed above for the calculation of the mean of an attribute $X_{1k}$, the preferred embodiment maintains statistical information upon which the access structure is organized. In other embodiments the statistical information can contain statistics from any other attribute of the records, or from combinations of attributes.

The preferred embodiment of the present invention has been disclosed for the purposes of description and example. Those skilled in the art will recognize that many modifications and variations can be made without departing from the spirit of the invention. It is intended that the scope of the invention be defined by the claims attached hereto.

We claim:

1. A data processing system for maintaining a data access structure which facilitates the processing of statistical queries relating to records stored in the structure, each of the records including a search key and record data, the system comprising:
   a data storage medium;
   means for maintaining, in the data storage medium, a plurality of data nodes, each storing a subset of the records, and a plurality of access nodes as a B-tree including a series of successive levels, the levels including a first level including a root access node and a last level including the data nodes, each one of the access nodes being linked to at least one other of the access nodes or to at least one of the data nodes, each of the access nodes which is not linked directly to any of the data nodes being indirectly linked through one or more intermediate ones of the access nodes to at least one of the data nodes;
   means for maintaining statistical information linked to at least a selected one of the access nodes, the statistical information being related collectively to the record data of the records stored in one or more of those of the data nodes which are linked directly or indirectly to the selected access node; and
   means, responsive to changes in the records, for updating the statistical information.

2. The system of claim 1, wherein:
   the means for maintaining the data nodes and access nodes include means for maintaining the access nodes and data nodes on a plurality of levels i, i going from 0 to n, n being greater than 1, level 0 including the root access node with pointers to nodes in level 1, and access nodes in level i having pointers to those of the access nodes and/or data nodes in level i+1, for i equal to 1 through n−1, and level n including data and
   the means responsive to changes in the records for updating the statistical information is operable, responsive to a change in a record stored at one of the data nodes linked directly or indirectly to the selected access node on level i that results in a change exceeding a threshold in the statistical information of the selected access node, for recomputing the statistical information of the selected access node.

3. The system of claim 1, wherein:
   the means for maintaining the data nodes includes means for maintaining, for each of the data nodes, a storage location for storing the statistical information; and
   the means for maintaining the access nodes includes means for maintaining a pointer in the selected access node which points to the storage location.

4. The system of claim 1, further including means for maintaining second statistical information linked to one of the access nodes, which is a child node of the selected access node concerning the records stored in those of the data nodes which are linked directly or indirectly to the child node, said child node being linked directly to the selected access node; and
   wherein said means for recomputing the statistical information of the selected access node includes:
   means for promoting the statistical information linked to the child node for combination with the statistical information of the selected access node;
   means for storing a last promoted version of the statistical information linked to the child node; and
   means for comparing the last promoted version of the statistical information linked to the child node with a recomputed version of the statistical information linked to the child node to determine whether the threshold is exceeded.

5. A data processing system for maintaining a data access structure which facilitates the processing of statistical queries relating to records stored in the structure, each of the records including a search key and record data, the system comprising:
   a data storage medium;
   means for maintaining, in the data storage medium, a plurality of data nodes, each storing a subset of the records, and a plurality of access nodes as a B-tree including a series of successive levels, the levels including a first level including a root access node and a last level including the data nodes, each one of the access nodes being linked to at least one other of the access nodes or to at least one of the data nodes, each one of the access nodes which is not linked directly to any of the data nodes being indirectly linked through one or more intermediate ones of the access nodes to at least one of the data nodes;
   means for maintaining statistical information stored in at least a selected one of the access nodes related collectively to the recorded stored in one or more of those of the data nodes which are linked directly or indirectly to the selected access nodes; and
   means, responsive to changes in the records, for updating the statistical information.

6. The system of claim 5, further including means for maintaining second statistical information stored in one of the access nodes, which is a child node of the selected access node, concerning the records stored those of the data nodes which are linked directly or indirectly to the child node, said child node being linked directly to the selected access node; and
   wherein said means for updating the statistical information includes:
   means for promoting the statistical information stored in the child node for combination with the statistical information of the selected access node;

means for storing a last promoted version of the statistical stored in the child node; and means for comparing the last promoted version of the statistical information linked to the child node with a recomputed version of the statistical information stored in the child node to determine whether the threshold is exceeded.

7. The system of claim 5, wherein:

the means for maintaining the data nodes and access nodes include means for maintaining the access node and data nodes on a plurality of levels i, i going from 0 to n, n being greater than 1, level 0 including the root access node with pointers to nodes in level 1, and access nodes in level i having pointers to those of the access nodes and/or data nodes in level i+1, for i equal to 1 through n−1, and level n including data nodes; and the means responsive to changes in the records for updating the statistical information is operable, responsive to a change in a record stored at one of the data nodes linked directly or indirectly to the selected access node no level i that results in a change exceeding a threshold in the statistical information of the selected access node, for recomputing the statistical information of the selected access node.

8. A computer implemented method, for use with a data processing and storage system, for facilitating inquiries relating to data records stored in nodes of an hierarchical data structure having a plurality of successive layers of nodes, each of the data records including a search key and record data, the nodes including (a) first nodes, each one of the first nodes including linking information for linking to a node in a next previous one of the layers, and (b) second nodes, each one of the second nodes including linking information for linking to at least one of (i) a node in a next previous one of the layers, and (ii) at least one node in a next successive one of the layers, each respective one of the second nodes at a given layer thereby being linked, directly or indirectly, with a respective set of nodes in at least one of the layers successive to the given layer, the data records being stored in various ones of the respective set of nodes, and making up a respective set of data records corresponding with the respective second node, the method comprising the steps of:

maintaining, in respective ones of the second nodes, respective pieces of statistical information related collectively to the record data of the data records making up the respective sets of data records; and, responsive to a change in a given one of the stored data records, the given data record being stored in a given one of the nodes, updating the respective pieces of statistical information maintained in each one of the second nodes for which the given node belongs in the respective set of nodes.

9. A method as recited in claim 8, wherein the step of updating includes:

determining whether the change in the data record engenders a change in the statistical information which exceeds a predetermined threshold; and updating the respective pieces of statistical information responsive to a determination, in the step of determining, that the change in the statistical information does exceed the predetermined threshold.

10. A method as recited in claim 9, wherein the step of updating includes:

promoting statistical information of one of the first plurality of access nodes to the corresponding access node of the second plurality for combination with the statistical information of the corresponding access node of the second plurality;

storing a last promoted version of the statistical information from the access node of the first plurality; and comparing the last promoted version of the statistical information with a recomputed version of the statistical information to determine whether the threshold is exceeded.

11. A method as recited in claim 8, wherein the step of maintaining includes maintaining the first and second nodes in the form of a B-tree.

12. A method as recited in claim 8, wherein the step of maintaining includes:

storing each respective piece of statistical information in a predetermined storage location; and maintaining a respective pointer in each respective one of the second nodes which points to the predetermined storage location.

13. A data processing and storage system, for facilitating inquiries relating to data records stored in nodes of an hierarchical data structure having a plurality of successive layers of nodes, each of the data records including a search key and record data, the nodes including (a) first nodes, each one of the first nodes including linking information for linking to a node in a next previous one of the layers, and (b) second nodes, each one of the second nodes including linking information for linking to at least one of (i) a node in a next previous one of the layers, and (ii) at least one node in a next successive one of the layers, each respective one of the second nodes at a given layer thereby being linked, directly or indirectly, with a respective set of nodes in at least one of the layers successive to the given layer, the data records being stored in various ones of the respective set of nodes, and making up a respective set of data records corresponding with the respective second node, the system comprising:

means for maintaining, in respective ones of the second nodes, respective pieces of statistical information related collectively to the record data of the data records making up the respective sets of data records; and, means, operable responsive to a change in a given one of the stored data records, the given data record being stored in a given one of the nodes, for updating the respective pieces of statistical information maintained in each one of the second nodes for which the given node belongs in the respective set of nodes.

14. A system as recited in claim 13, wherein the means for updating includes:

means for determining whether the change in the data record engenders a change in the statistical information which exceeds a predetermined threshold; and means for updating the respective pieces of statistical information responsive to a determination, by the means for determining, that the change in the statistical information does exceed the predetermined threshold.

15. A system as recited in claim 14, wherein the means for updating includes:

means for promoting statistical information of one of the first plurality of access nodes to the corresponding access node of the second plurality for combination with the statistical information of the corresponding access node of the second plurality;

means for storing a last promoted version of the statistical information from the access node of the first plurality; and means for comparing the last promoted version of the statistical information with a recomputed version of the statistical information to determine whether the threshold is exceeded.

16. A system as recited in claim 13, wherein the means for maintaining includes means for maintaining the first and second nodes in the form of a B-tree.

17. A system as recited in claim 13, wherein the means for maintaining includes:

means for storing each respective piece of statistical information in a predetermined storage location; and means for maintaining a respective pointer in each respective one of the second nodes which points to the predetermined storage location.

18. A computer program product, for use with a data processing and storage system, for facilitating inquiries relating to data records stored in nodes of an hierarchical data structure having a plurality of successive layers of nodes, each of the data records including a search key and record data, the nodes including (a) first nodes, each one of the first nodes including linking information for linking to a node in a next previous one of the layers, and (b) second nodes, each one of the second nodes including linking information for linking to at least one of (i) a node in a next previous one of the layers, and (ii) at least one node in a next successive one of the layers, each respective one of the second nodes at a given layer thereby being linked, directly or indirectly, with a respective set of nodes in at least one of the layers successive to the given layer, the data records being stored in various ones of the respective set of nodes, and making up a respective set of data records corresponding with the respective second node, the computer program product comprising:

a recording medium;

means, recorded on the recording medium, for directing the data processing and storage system to maintain, in respective ones of the second nodes, respective pieces of statistical information related collectively to the record data of the data records making up the respective sets of data records; and, means, recorded on the recording medium, for directing the data processing and storage system, responsive to a change in a given one of the stored data records, the given data record being stored in a given one of the nodes, to update the respective pieces of statistical information maintained in each one of the second nodes for which the given node belongs in the respective set of nodes.

19. A computer program product as recited in claim 18, wherein the means for directing to update includes:

means, recorded on the recording medium, for directing the data processing and storage system to determine whether the change in the data record engenders a change in the statistical information which exceeds a predetermined threshold; and means, recorded on the recording medium, for directing the data processing and storage system to update the respective pieces of statistical information responsive to a determination, by the means for determining, that the change in the statistical information does exceed the predetermined threshold.

20. A computer program product as recited in claim 19, wherein the means for directing to update includes:

means, recorded on the recording medium, for directing the data processing and storage system to promote statistical information of one of the first plurality of access nodes to the corresponding access node of the second plurality for combination with the statistical information of the corresponding access node of the second plurality;

means, recorded on the recording medium, for directing the data processing and storage system to store a last promoted version of the statistical information from the access node of the first plurality; and means, recorded on the recording medium, for directing the data processing and storage system to compare the last promoted version of the statistical information with a recomputed version of the statistical information to determine whether the threshold is exceeded.

21. A computer program product as recited in claim 18, wherein the means for directing to maintain includes means, recorded on the recording medium, for directing the data processing and storage system to maintain the first and second nodes in the form of a B-tree.

22. A computer program product as recited in claim 18, wherein the means for directing to maintain includes:

means, recorded on the recording medium, for directing the data processing and storage system to store each respective piece of statistical information in a predetermined storage location; and means, recorded on the recording medium, for directing the data processing and storage system to maintain a respective pointer in each respective one of the second nodes which points to the predetermined storage location.

* * * * *